[33.]

CHRISTIAN SHARPS.
Improvement in Revolving Fire-Arms.

No. 118,752. Patented Sep. 5, 1871.

WITNESSES:
Wm. A. Steel
John Parker

Christian Sharps
by his Atty.
Stinson and Son

UNITED STATES PATENT OFFICE.

CHRISTIAN SHARPS, OF PHILADELPHIA, PENNSYLVANIA.

IMPROVEMENT IN REVOLVING FIRE-ARMS.

Specification forming part of Letters Patent No. 118,752, dated September 5, 1871.

*To all whom it may concern:*

Be it known that I, CHRISTIAN SHARPS, of Philadelphia, county of Philadelphia, State of Pennsylvania, have invented Improvements in Revolving Fire-Arms, of which the following is a specification:

My invention consists of certain improvements in revolving fire-arms, too fully explained hereafter to need preliminary explanation, the main feature of the said improvements being the eccentric pivoting of the barrel to the frame for the twofold purpose of enabling the rear end of the cylinder to be brought close up to and turned outward from the frame without involving the usual necessity of rounding off its corners, and also for the purpose of enabling the cartridge-extractor to be readily and effectually operated.

Figure 1:
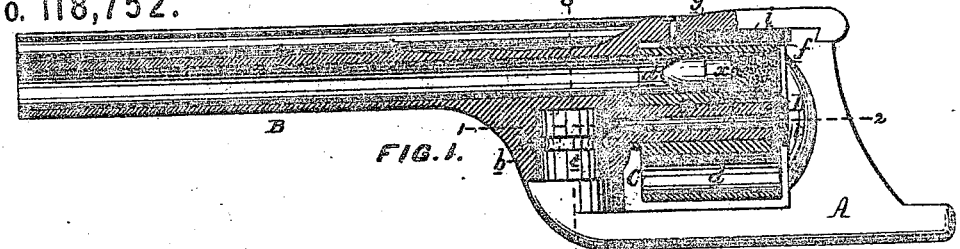
Figure 7:
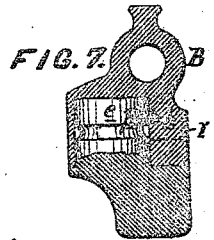
Figure 3:
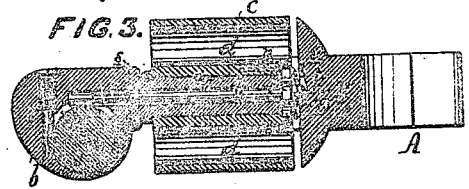
Figure 8:
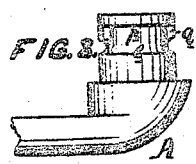
Figure 4:
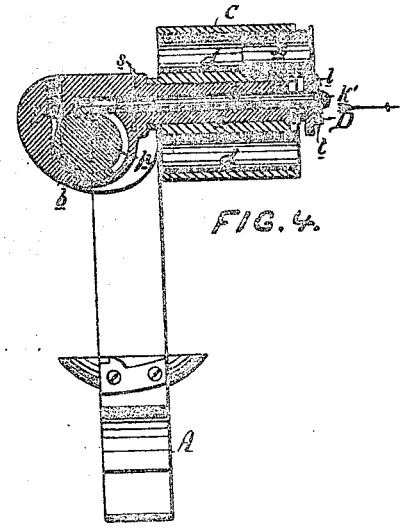
Figure 6:
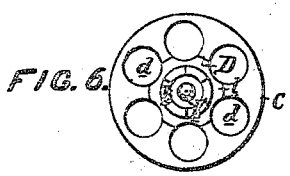
Figure 2:
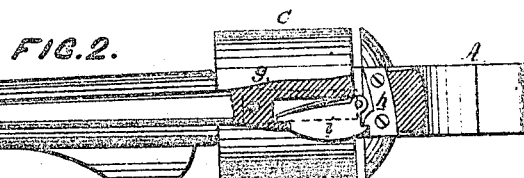
Figure 5:
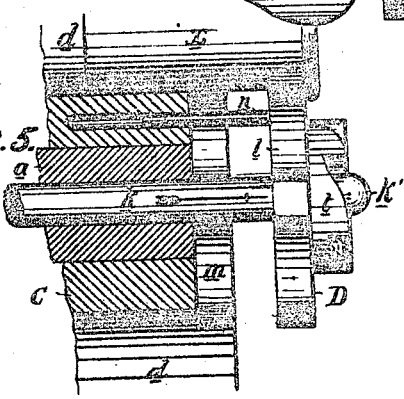

Figure 1 is a longitudinal section of my improved revolving fire-arm; Fig. 2, a plan view of the same, partly in section; Fig. 3, a sectional plan on the line 1 2, Fig. 1; Fig. 4, the same as Fig. 3, with the parts in a different position; Fig. 5, an enlarged view of part of Fig. 4; Fig. 6, a rear view of the cylinder and cartridge-extractor; Fig. 7, a transverse section on the line 3 4, Fig. 1; and Fig. 8, a detached view of part of the fire-arm.

A represents the frame of the fire-arm, secured to or forming a part of the stock; B, the barrel; and C, the revolving cylinder. The latter is hung to and can turn freely upon a hollow stem, $a$, extending rearward from a projection, $b$, beneath the barrel; and the said cylinder has the usual chambers $d$ adapted for the reception of metallic cartridges $x$, and arranged to be brought successively opposite the barrel on the revolution of the cylinder. The projection $b$, above referred to, instead of being formed directly beneath the center of the barrel, projects outward from one side of the same, as plainly shown in Figs. 3, 4, and 7, and has formed in it a cylindrical recess of enlarged diameter adapted for the reception of a stem, $e$, of corresponding shape, secured to or forming part of the frame A, and serving as a pivot upon which the barrel can be turned outward from the frame, as shown in Fig. 4, when it is desired to expose the rear end of the cylinder. The latter is retained upon the hollow stem $a$, but in such a manner as not to interfere with its free rotation, by a light spring or catch, $f$, Fig. 1, secured to the under side of the portion $g$ of the barrel, and bent at its outer end so as to lap over the rear edge of the cylinder. The barrel, when closed upon the frame, as shown in Figs. 1, 2, and 3, is locked to the same and prevented from accidentally turning upon the pivot $e$ by means of a curved projection, $h$, of the frame, which limits the movement of the barrel in one direction, and a spring-catch, $i$, Fig. 2, of the barrel, adapted to a hook on the curved projection $h$, and which prevents any movement of the barrel in the opposite direction. The projection $b$ is extended outward to one side of the barrel in order that the stem or pivot $e$ may be placed eccentrically in respect to the centers of the barrel and cylinder, and the pivot is thus placed for two reasons: first, to enable the rear open end of the cylinder to be brought close up to and turned outward from the frame without risk of striking against the latter, and without involving the usual necessity of rounding off its corners; and second, to enable the said pivot to be employed as a means of operating the cartridge-extractor D. The cartridge-extractor consists of a cylindrical rod, $k$, adapted to an opening in the hollow stem $a$, and having secured to its rear end a plate, $l$, which forms the extractor proper, and which is fitted to a recess, $m$, in the rear end of the cylinder, so that when drawn in it may be flush with the exterior of the latter and extend partly into each of the chambers of the same, the edges of the said plate being curved, so that it may fit part way round each cartridge without interfering with its free introduction into the cylinder, and so that the flange of the cartridge may also overlap the rear edge of the said plate. (See Figs. 5 and 6.) As it is essential that the curved edges of the extractor-plate $l$ should be retained in one given position opposite the chambers of the cylinder, the whole extractor is caused to revolve with, but is prevented from turning independently of, the latter by means of a rod, $n$, secured to the plate $l$ and adapted to a recess in the cylinder. (See Fig. 5.) The rod $k$ of the extractor runs forward to a point opposite the eccentric pivot $e$, and a portion of one side of the latter is cut away, as shown in Figs. 3, 4, 7, and 8, so as to form a groove, $p$, for the reception of the rod $k$, and an abrupt shoulder, $q$, which, when the barrel is turned upon the said pivot, strikes against the end of the rod and thrusts it rearward, as indicated by the arrows in Figs. 4 and 5. The pivot e is prevented from being withdrawn from its position in the recessed projection b of the barrel by a screw-pin, r, adapted to an annular groove cut in the said pivot and; the extractor-rod k is similarly prevented by a pin, s, from being drawn outward in the direction of the arrow from the stem a. The extractor is forced outward, as above described, by the shoulder q of the eccentric pivot e, and it may be either pushed inward by hand, be permitted to fall inward by its own weight, or be acted on by a suitable spring. The usual notched projection t by which the cylinder is turned through the medium of a finger, which receives its motion from the hammer, is, in the present instance, secured to the rear face of the plate l of the extractor, instead of directly to the cylinder, as in ordinary revolvers, and a rounded projection, k', of the extractor, at the rear of the said notched projection, is adapted to a recess, u, of the frame when the barrel is closed, and thus serves to brace or support the hollow stem a and to reduce the strain of the cylinder upon the same when the fire-arm is discharged.

To load the fire-arm, the spring-catch i is pressed back with one hand to unlock the barrel, while with the other hand the barrel is turned sufficiently upon the eccentric pivot to entirely expose the rear end of the cylinder, the chambers in which are then filled with ordinary metallic cartridges x. The barrel is then closed and locked between the curved projection h of the frame and the spring-catch i, as before described, the rounded end k' of the extractor striking against the inclined edges of the recess u of the frame in the act of closing the barrel, and thus forcing the extractor-case up to and into the recess at the rear of the cylinder.

When all of the cartridges have been discharged the barrel is opened as before, but to a greater extent, in order that the shoulder q of the eccentric pivot may strike the end of the extractor-rod, and thus force the plate l outward from the cylinder, as shown in Figs. 4 and 5, the said plate pushing before it, and partially withdrawing from the chambers of the cylinder the whole number of empty cartridge-cases, which are thus pushed forward to a sufficient extent to enable them to be entirely withdrawn by hand prior to the reloading of the fire-arm and the closing up of the barrel.

I claim—

1. A revolving fire-arm in which the barrel is hung to the frame and arranged to turn eccentrically upon a vertical axis, substantially as herein described.

2. The vertical eccentric pivot e, so arranged in respect to the centers of the barrel and revolving cylinder that the rear end of the said cylinder can be brought close up to and turned outward from the frame, without risk of striking the latter, and without involving the usual necessity of rounding off its corners.

3. The combination, substantially as herein described, of the eccentric pivot e and its shoulder or shoulders with the cartridge-extractor D.

In testimony whereof I have signed my name to this specification in the presence of two subscribing witnesses.

CHRISTIAN SHARPS.

Witnesses:
WM. A. STEEL,
JOHN K. RUPERTUS.